(12) United States Patent
Yoshihara et al.

(10) Patent No.: US 6,658,948 B2
(45) Date of Patent: Dec. 9, 2003

(54) SEMICONDUCTOR DYNAMIC QUANTITY SENSOR (75) Inventors: Shinji Yoshihara, Nagoya (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 10/053,705

(22) Filed: Jan. 24, 2002

(65) Prior Publication Data

US 2002/0100948 A1 Aug. 1, 2002

(30) Foreign Application Priority Data

Jan. 31, 2001 (JP) .......................... 2001-024187
Apr. 11, 2001 (JP) .......................... 2001-113078
Jul. 23, 2001 (JP) .......................... 2001-221697

(51) Int. Cl.[7] ..................... G01L 1/22; H01L 29/84
(52) U.S. Cl. ................... 73/862.628; 257/419
(58) Field of Search ................ 257/414, 415, 257/417, 418, 419, 420; 438/48, 50, 53; 338/2, 5, 6; 73/862.68, 862.627, 862.628

(56) References Cited

FOREIGN PATENT DOCUMENTS

| JP | B2-2-59635 | 12/1990 |
| JP | A-10-506718 | 6/1998 |
| JP | B2-3049532 | 3/2000 |
| WO | WO 97/05464 | 2/1997 |

OTHER PUBLICATIONS

U.S. patent application Ser. No. 09/666,085, Oba et al., filed Sep. 21, 2000.

*Primary Examiner*—Evan Pert
(74) *Attorney, Agent, or Firm*—Posz & Bethards, PLC (57) ABSTRACT A bridge circuit includes four gage resistors. Each gage resistor is divided into two division gage resistors. A couple of division gage resistors. The junction points between division gage resistors outputting the same potential when no pressure is applied are used for diagnostic. Four gage resistors out of the eight gage resistors are arranged near the center of diaphragm 14, and the other four division resistors are arranged near the peripheral edge portion of the diaphragm 14 to make the stress distribution even.

14 Claims, 10 Drawing Sheets

SEMICONDUCTOR DYNAMIC QUANTITY SENSOR

BACKGROUND OF THE INVENTION

1. Field of the Invention

This invention relates to a semiconductor dynamic quantity sensor for detecting a dynamic quantity.

2. Description of the Prior Art

Semiconductor dynamic quantity sensors including a gage resistor bridge on a semiconductor diaphragm for detecting a dynamic quantity such as pressure or acceleration are known. The diaphragm is bent by application of a dynamic quantity. This generates stress distribution over the diaphragm. Some gage resistors receive tensile stress and the others receive compression stress. This varies the resistances of these gage resistors, so that the bridge outputs a dynamic quantity detection signal. Moreover, a semiconductor dynamic quantity sensor having a test function is also known. Japanese patent application provisional publication No. 10-506718(DE19527687, EP0783677) discloses such a semiconductor dynamic quantity sensor. This discloses as follows:

A testable and highly available sensor has a measurement membrane that bears the resistances of two different full bridges. On the right half radial compressions and extensions are used. On the left half radial compressions but tangential extensions are used. Ageing phenomena influence the sensitivity of both full bridges to a different extent, so that the sensor may be tested during its operation without any special reference measurements. In addition, one full bridge may be used in an emergency when the other full bridge breaks down.

Japanese patent publication No. 3049532 discloses a semiconductor dynamic quantity sensor with a diagnostic function. This discloses as follows:

To detect variation of initial sensor characteristic values, first and second bridges each having four gage resistors are connected in parallel. The output signals from these bridges are compared with each other. Monitoring variation in the output signal provides diagnostic.

SUMMARY OF THE INVENTION

The aim of the present invention is to provide a superior dynamic quantity sensor.

According to the present invention, a first aspect of the present invention provides a semiconductor dynamic quantity sensor comprising: a semiconductor substrate having a diaphragm elastically deformed in accordance with application of a dynamic quantity with a stress distribution over at least said diaphragm; and a bridge circuit including four gage resistors in said diaphragm, resistances of said gage resistors varying on the basis of stresses due to said stress distribution, respectively, said bridge circuit having first and second potential inputs and having two outputs at intermediate junction points between said first and second inputs, each of said four gage resistors including a plurality of division gage resistors which are separated into first and second groups, wherein said first group of division gage resistors are arranged at a first place near the center of said diaphragm such that said division gage resistors of said first group receive stresses due to said stress distribution, magnitudes of which stresses are even with each other, and said second group of division gage resistors are arranged near a peripheral edge of said diaphragm such that said division gage resistors of said second group receive said stresses due to said stress distribution, magnitudes of which stresses are even with each other.

According to the present invention, a second aspect of the present invention provides a semiconductor dynamic quantity sensor based on the first aspect, wherein a first junction point of a first pair of said division gage resistors in one of said gage resistor outputting a first potential and a second junction point of a second pair of said division gage resistors in another of said gage register outputting a second potential provide a diagnostic output, said first potential is substantially equal to said second potential when said dynamic quantity is not applied to said diaphragm.

According to the present invention, a third aspect of the present invention provides a semiconductor dynamic quantity sensor based on the first aspect, wherein said semiconductor substrate comprises a support portion, and said diaphragm and said support portion are formed such that said stress at a center of said diaphragm due to said stress distribution is greatest and decreases substantially coaxially from said center to said peripheral edge of said diaphragm.

According to the present invention, a fourth aspect of the present invention provides a semiconductor dynamic quantity sensor based on the third aspect, wherein said diaphragm has a shape of a square.

According to the present invention, a fifth aspect of the present invention provides a semiconductor dynamic quantity sensor based on the third aspect, wherein said diaphragm has a shape of a circle.

According to the present invention, a sixth aspect of the present invention provides a semiconductor dynamic quantity sensor based on the second aspect, wherein if it is assumed that first and second axes perpendicularly intersects each other at said center of said diaphragm on a top surface of said diaphragm, said division gage resistors of said first group are arranged point-symmetrically at different four quadrants defined by said first and second axes, respectively, and said division gage resistors of said second group are arranged point-symmetrically at different said four quadrants.

According to the present invention, a seventh aspect of the present invention provides a semiconductor dynamic quantity sensor based on the first aspect, wherein all said division gage resistors have the same resistance.

According to the present invention, an eighth aspect of the present invention provides a semiconductor dynamic quantity sensor based on the first aspect, wherein said bridge circuit further comprises two wiring patterns for connection between each successive two of said division gage resistors, wherein if it is assumed that said bridge circuit including said division gage resistors and said wiring patterns are symmetrically represented in an equivalent circuit diagram, each pair of said wiring patterns arranged at line-symmetrical positions regarding a line between said intermediate junction points on said equivalent circuit diagram have the same wiring resistance each other.

According to the present invention, a ninth aspect of the present invention provides a semiconductor dynamic quantity sensor based on the eighth aspect, wherein each pair of said division gage resistors arranged at line-symmetrical positions regarding a line between said first and second input points on said equivalent circuit diagram of said bridge circuit have the same wiring resistance.

According to the present invention, a tenth aspect of the present invention provides a semiconductor dynamic quantity sensor based on the eighth aspect, wherein each pair of said wiring patterns have rectangular shapes with the same ratio between different sides of said rectangular patterns.

According to the present invention, an eleventh aspect of the present invention provides a semiconductor dynamic quantity sensor based on the eight aspect, wherein said wiring patterns have the same wiring resistance.

According to the present invention, a twelfth aspect of the present invention provides a semiconductor dynamic quantity sensor based on the eighth aspect, wherein said wiring patterns have rectangular shapes having the same ratio between different sides of said rectangular shapes.

According to the present invention, a thirteenth aspect of the present invention provides a semiconductor dynamic quantity sensor based on the eight aspect, wherein at least one of said wiring patterns includes resistance trimming means with a notch formed in said wiring pattern for trimming said wiring resistance of said wiring pattern.

According to the present invention, a fourteenth aspect of the present invention provides a semiconductor dynamic quantity sensor based on the thirteenth aspect, wherein each of said division gage resistors has straight bars extending in a first direction and turning portions connecting said straight bars in series, said notch has a rectangular shape, a longitudinal direction of said rectangular shape of said notch is arranged in a second direction perpendicular to said first direction.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

The semiconductor dynamic quantity sensor according to this invention suppresses variation of sensitivity due to position deviation of gage resistors and reduces the offset voltage. A semiconductor pressure sensor is explained in the following embodiment as the semiconductor dynamic quantity sensor.

Embodiment

Figure 1:
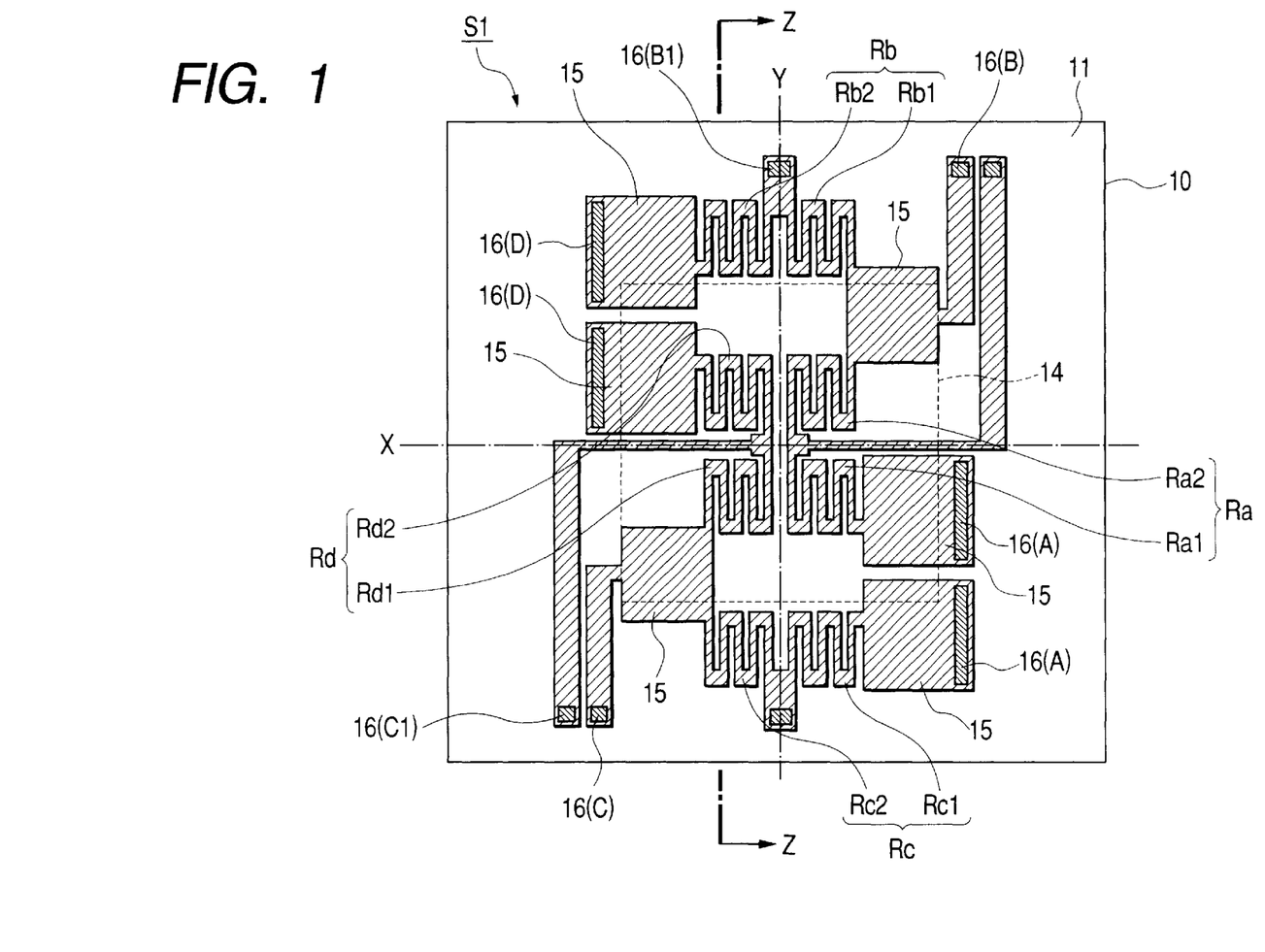
FIG. 1 is a plan view of the semiconductor pressure sensor according to an embodiment of the present invention.
Figure 2:
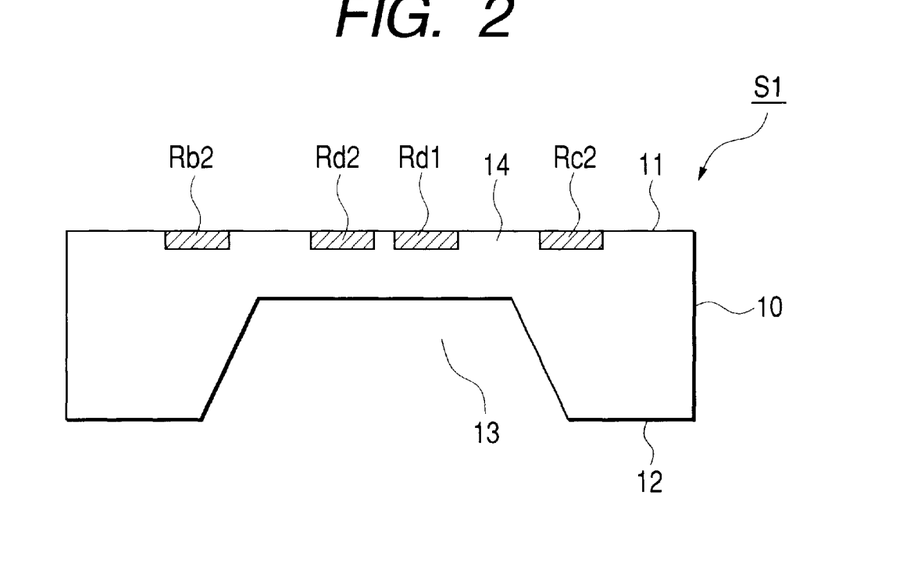
FIG. 2 is a sectional side elevation view taken on line Z—Z in FIG. 1.
Figure 3:
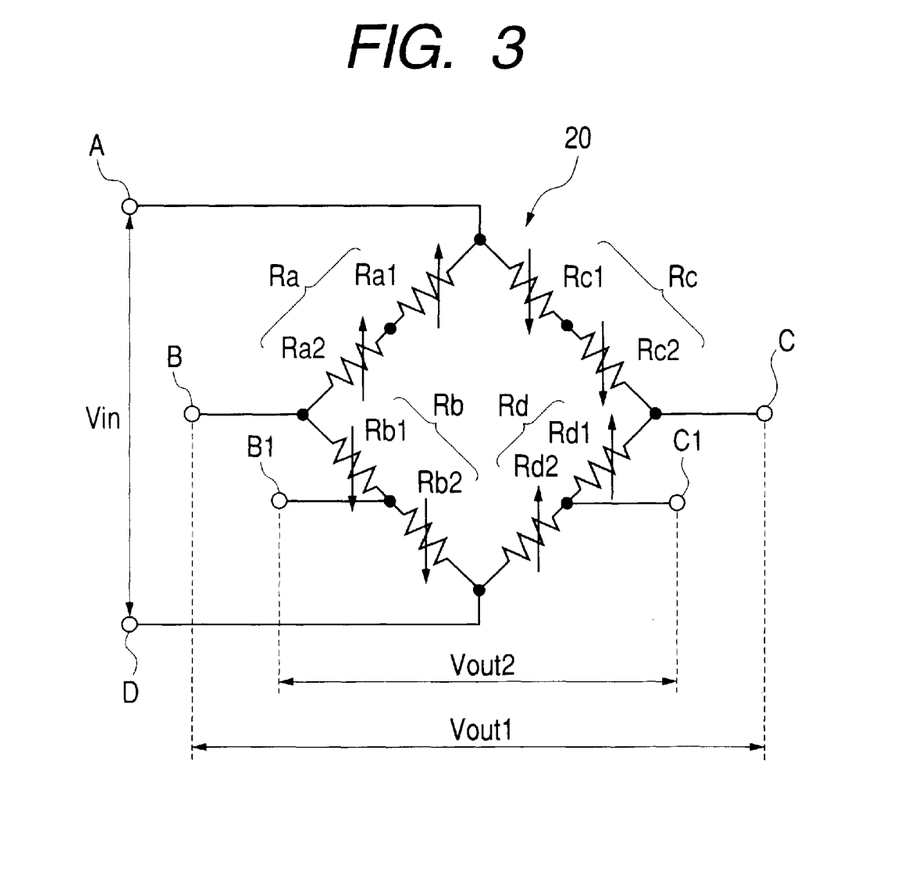
FIG. 3 is an equivalent circuit diagram of the pressure sensor according to the embodiment of FIG. 1.

FIG. 1 is a plan view of the semiconductor pressure sensor S1 according to this embodiment. FIG. 2 is a sectional side elevation view taken on line Z—Z in FIG. 1. FIG. 3 is an equivalent circuit diagram of the pressure sensor S1. This semiconductor pressure sensor S1 can be manufactured by well-known semiconductor production techniques.

The semiconductor pressure sensor S1 comprises a semiconductor substrate 10 made of a silicon single crystal substrate having (110) plane at the top surface 11 thereof. FIG. 1 shows this (110) plane, wherein X axis (first axis) shown by a dashed line represents (001) crystal axis, and Y axis (second axis) represents (110) crystal axis.

The semiconductor substrate 10 has a hollow portion 13 which is formed by etching the bottom surface 12 of the semiconductor substrate 10 to provide a diaphragm 14 (thin portion). The diaphragm 14 bends, i.e., elastically deformed, by application of a pressure to the surface 11 or 12. The diaphragm 14 has a square shape, and its thickness is even within allowance for processing thereover.

In the semiconductor substrate 10, four gage resistors Ra, Rb, Rc, and Rd are formed on the surface 11 by ion-implantation or the diffusion method as strain gages, resistances of which vary with strain stress at the diaphragm 14.

These four gage resistors Ra to Rd (Ra, Rb, Rc, and Rd) form a bridge circuit 20 as shown in FIG. 3, wherein the (110) crystal axis (Y axis) is used to provide a relative high sensitivity. Out of these four gage resistors, two gage resistors (center portion gage resistors) Ra and Rd are arranged near the center of the diaphragm 14 (intersection of X and Y axes), and the other two gage resistors (peripheral edge portion gage resistors) Rb and Rc are arranged near the peripheral edge portion of the diaphragm 14. That is, the center portion gage resistors Ra and Rd are arranged nearer the center of the diaphragm 14 than the peripheral portion gage resistors Rb and Rc. On the other hand, the peripheral edge portion gage resistors Rb and Rc are arranged nearer the peripheral edge of the diaphragm 14 than the center portion gage resistors Ra and Rb. More specifically, the peripheral edge gage resistors Rb and Rc are located outside the peripheral edge of the diaphragm 14 as shown in FIGS. 1 and 2 in this embodiment.

The center portion gage resistors Ra and Rd and the peripheral edge portion gages Rb and Rc receive opposite polarity of stresses, that is, tensile stress and compression stress, when a pressure is applied to the diaphragm, so that the resistances vary with opposite polarities.

Each of gage resistors Ra to Rd has a folded bar pattern which is further divided into two parts. That is, division gage resistors Ra1, Ra2, Rb1, Rb2, Rc1, Rc2, Rd1, and Rd2 (Rd1 to Rd2) are formed as shown in FIG. 1. These division resistors Ra1 to Rd2 have the same resistance at a rest condition of the diaphragm.

Moreover, on the surface 11 of the semiconductor substrate 10, leader (wiring) patterns 15 for connecting division gage resistors Ra1 to Rd2 in series to form the bridge circuit 20 and contact portions 16 for input terminals and output terminals of the bridge circuit 20, and wiring portions are formed by ion-implantation or diffusion or the like. In FIG. 1, the gage resistors Ra to Rd, the leader patterns 15, the contact portions 16, and wiring portions are hatched to be clearly shown.

Respective leader patterns 15 are formed to have relatively larger areas to make their resistances neglected in the bridge circuit 20 and thus, have substantially square shapes. The contact portions 16 are electrically connected to an external circuit (not shown).

FIG. 3 shows an equivalent circuit diagram of the bridge circuit 20. The bridge circuit 20 is provided in a Whetstone bridge with four gage resistors Ra, Rb, Rc, and Rd (eight division gage resistors).

The contact portions 16 corresponding to the terminals A, B, C, D, B1, and C1 in FIG. 3, are shown in FIG. 1 with parentheses such that 16(A), 16(B), 16(C), 16(D), 16(B1), and 16(C1), respectively. Moreover, in FIG. 1, if there are the same portions such as 16(A), these are electrically connected to each other and further connected to the external circuit.

The Whetstone bridge has a closed circuit having a form of four sides of a quadrilateral, wherein the gage resistors Ra to Rd are connected in series. Junction points (terminals)A and D at corners of the quadrilateral facing each other and junction points (terminals) B and C are used for supplying an input voltage Vin and for outputting a differential signal Vout1 as a sensor output, respectively. In this embodiment, the input terminal A is connected to a power supply (first potential), and the input terminal D is connected to the ground (second potential). Thus, the potential at the terminal A is referred to as a potential A and that at the terminal D, as a potential D throughout the specification.

In this bridge circuit 20, each of the gage resistors Ra to Rd is equally divided into two division resistors. That is, the gage resistor Ra connected between the input terminal A and the output terminal B is divided into the division gage resistor Ra1 and Ra2. The gage resistor Rb connected between the output terminal B and the input terminal D is divided into division resistors Rb1 and Rb2. The gage resistor Rc connected between the input terminal A and the output terminal C is divided into division gage resistors Rc1 and Rc2. The gage resistors Rd connected between the output terminal C and the input terminal D is divided into division gage resistors Rd1 and Rd2.

The division gage resistors Ra1, Ra2, Rd1, and Rd2 in the center portion gage resistors Ra and Rd (first group) show resistance variations with opposite polarity to division gage resistors Rb1, Rb2, Rc1, and Rc2 (second group) of the peripheral edge portion gage resistors Rb and Rc.

Each of the gage resistors Ra to Rd has a division resistor junction point between the division gage resistors. That is, there are a division resistor junction point between the division resistor Ra1 and Ra2, a division resistor junction point B1 between the division resistors Rb1 and Rb2, a division resistor junction point between the division resistors Rc1 and Rc2, and a division resistor junction point C1 between division resistor Rd1 and Rd2. In this embodiment, resistances of these division resistors Ra1 to Rd2 are determined such that a couple of the division resistor junction points between the Ra1 and Ra2 and between Rc1 and Rc2 outputs the same potential, and that a couple of the division resistor junction points B1 and C1 output the same potential, when no pressure is applied to the diaphragm 14.

With this structure, a potential difference Vout2 between the division resistor junction points B1 and C1 is used for diagnostic. More specifically, the difference voltage Vout2 is amplified by an operational amplifier in the external circuit, and the output of the operational amplifier is used for diagnostic.

Figure 4:
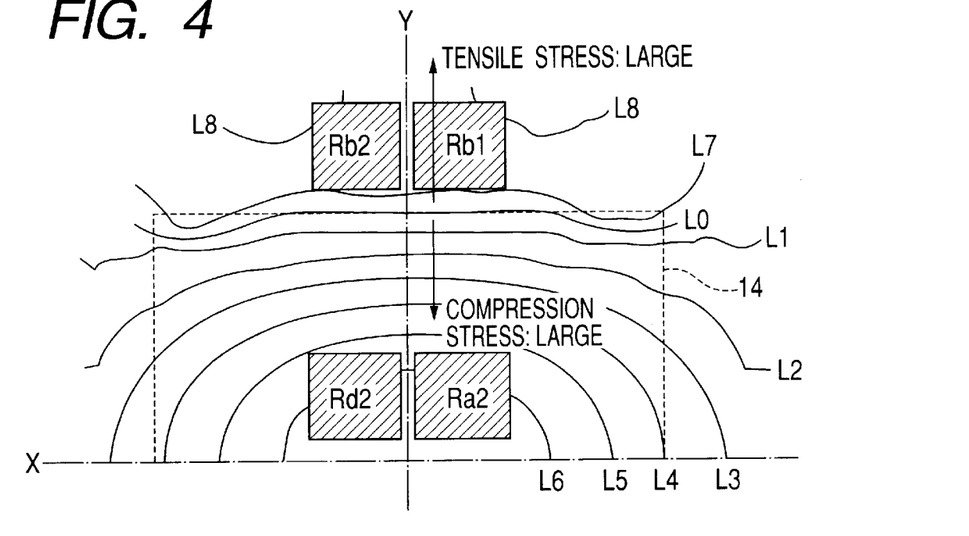
FIG. 4 is an illustration according to the embodiment of FIG. 1 illustrating distribution of stress in the diaphragm when the diaphragm is elastically deformed.

FIG. 4 illustrates distribution of stress in the diaphragm 14 when the diaphragm 14 is bent, that is, elastically deformed. The division gage resistors Ra1 to Rd2 are arranged in consideration of the distribution of stress generated with bending of the diaphragm 14.

In FIG. 4, lines L0 to L8 represent stress counter lines on the diaphragm 14 and its peripheral portion which were obtained by simulation analysis such as the finite element method (FEM) or the like. The stress distribution is represented by the stress contour lines L0 to L8 such that equivalent stresses are connected in a line such as a contour line in a map. The stress contour line L0 is assumed to represent a stress of zero.

The distribution shown in FIG. 4 shows the case that a pressure is applied to the diaphragm 14 on the side of the top surface 11 of the semiconductor substrate 10. Thus, tensile stress is generated outside the contour line L0 where the stress is zero (outside the diaphragm 14), and inside it, compression stress is generated. In FIG. 4, the lower part of the top surface of the diaphragm 14 (in the drawing) is omitted because the distribution is symmetry regarding X axis.

Figure 6:
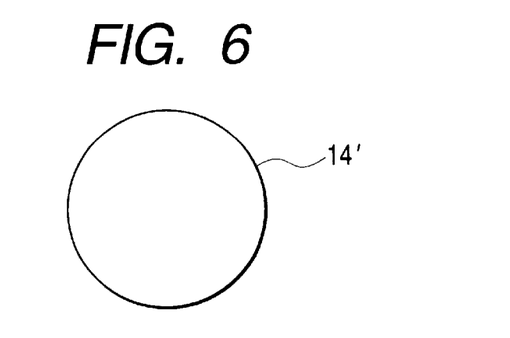
FIG. 6 is a plan view of the diaphragm shown in FIG. 1.

The diaphragm 14 according to this embodiment has (110) plane and has flat square shape, so that stress distribution over the diaphragm 14 has a maximum stress at its center and decreases with radial distance toward the peripheral edge portion of the diaphragm 14 substantially coaxially. The diaphragm 14 must have the shape having such a stress distribution and thus, may have a form of a circle 14' as shown in FIG. 6.

More specifically, a portion near the center of the diaphragm 14 generates a maximum stress of $-9.6$ kgf/mm$^2$, and the value of the stress coaxially decreases toward the contour line L0 as $-8.1$, $-6.7$, $-5.2$, $-3.8$, and $-2.3$ kgf/mm$^2$. Outside the peripheral edge portion of the diaphragm 14, a place near the peripheral edge portion shows a stress of 0.5 kgf/mm$^2$ which is relatively large.

In the semiconductor substrate 10 having such a stress distribution, the division gage resistors Ra1, Ra2, Rd1, Rd2 (first group) arranged near the center of the diaphragm 14 are disposed to receive stresses which are even with each other, and division gage resistors Rb1, Rb2, Rc2, Rc2 (second group) near the peripheral edge portion are arranged to receive stresses which are even with each other.

That is, the division gage resistors in the same group are arranged at places where the stresses are even (equivalent). The degree of evenness is shown in FIG. 4. For example, the division resistors Rd1 and Ra1 in the first group are arranged at place where stresses are $-9.6$ and $-8.1$ kgf/mm$^2$. The division resistors Rb1 and Rb2 in the second group are located at places where the stress is 0.5 kgf/mm$^2$.

The whole arrangement of the division resistors Ra1 to Rd2 according to this embodiment is shown in FIG. 1. In FIG. 1, the first group of four division gage resistors Ra1, Ra2, Rd1, and Rd2 are point-symmetrically arranged. The second group of division gage resistors Rb1, Rb2, Rc1, and Rc2 are point-symmetrically arranged also. Moreover, four division gage resistors of each group are located on different quadrants defined by the X and Y axes.

Referring now to FIG. 3, the operation of the semiconductor dynamic quantity sensor S1 will be described. The semiconductor dynamic quantity sensor S1 has one input Vin, but on the other hand, it has two outputs Vout1 and Vout2, that is, the sensor output between output terminals B and C and diagnostic output between terminals B1 and C1.

In the condition that the input signal (potential) Vin is inputted to the bridge circuit 20, when the diaphragm 14 bent by application of a pressure thereto, this loses balance in resistance among four gage resistors Ra to Rd, so that the potential difference (output signal)Vout1 varies in accordance with the magnitude of the applied pressure. This output Vout is supplied to the external circuit to obtain the sensor output to detect the magnitude of the applied pressure.

To detect a failure, the potential difference Vout1 between the output terminals B and C is compared with the potential difference Vout2 between the division resistor junction points B1 and C1. In this embodiment, respective division gage resistors have the same resistances, so that the ratio in resistance between the division gage resistors Rd1 and Rd2 and the ratio in resistance between the division gage resistors Rb1 and Rb2 are 1:1, respectively. Accordingly, in the normal condition, that is, there is no failure, the potential difference Vout2 for the diagnostic output is always a half of the potential difference Vout1 for the sensor output.

Figure 5:
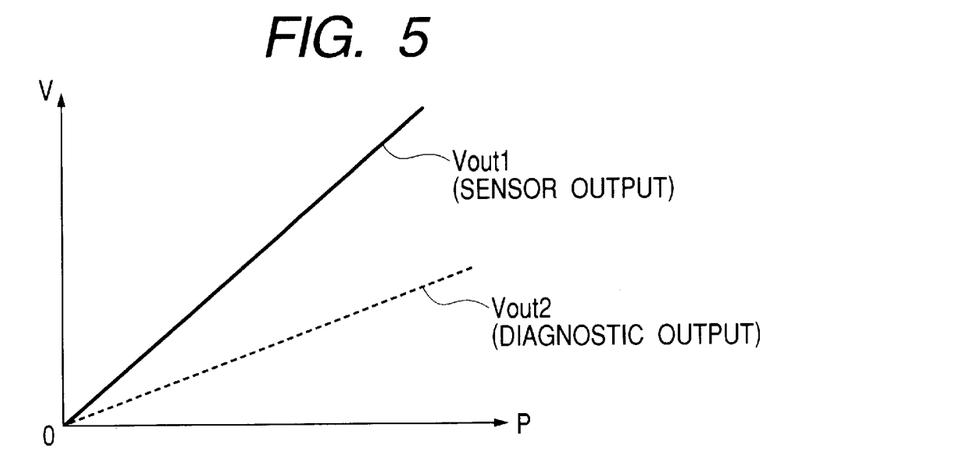
FIG. 5 is a graphical drawing according to an embodiment illustrating a relation in variations of the differential outputs Vout1 and Vout2 in the bridge circuit.

FIG. 5 illustrates this relation, that is, the variations of the differential outputs Vout1 and Vout2, wherein the pressure is represented along the axis of abscissas and the voltage (V) is represented along the axis of ordinates. With this relation, for example, the differential output Vout2 is amplified with a gain of two to provide a relation of 1:1 between the sensor output and the diagnostic output in the normal condition.

In an unusual condition, that is, when stress is applied to the diaphragm unevenly, or when disconnection occurs in a resistor, the ratio in resistance between the division resistors Rd1 and Rd2 or the ratio in resistance between the division resistors Rb1 and Rb2 deviates from 1:1. Then, the diagnostic output deviates from the half of the sensor output, that is, the ratio between the amplified the potential difference Vout2 with a gain of two and the potential difference Vout1 deviates from 1:1. This provides the judgment of the failure in the sensor S1.

If it is assumed that the diagnostic output Vout2 are not provided, that is, if the semiconductor dynamic quantity sensor S1 outputted only the sensor output Vout1, though the sensor output Vout1 becomes zero, it cannot be judged whether this is caused by either of damage of the diaphragm 14, a failure in the gage resistors, a failure in the external circuit, or the fact that the pressure is actually zero.

On the other hand, in this embodiment, though the sensor output Vout1 erroneously becomes zero, as long as the diagnostic output Vout is normal, it can be judged that the pressure is not zero, and no failure occurs in the external circuit, but a failure occurs in the diaphragm 14 or the gage resistor. Moreover, if the diagnostic output Vout2 is also zero, it can be judged that the external circuit has a failure or the pressure is actually zero.

As mentioned above, according to this invention, four gage resistors Ra to Rd forming the bridge circuit 20 are divided into two, respectively to provide eight division gage resistors Ra1 to Rd2. The division gage resistors of each gage resistor are connected through a division gage resistor junction point, wherein any couple of division gage resistor junction points outputting the same potential on no pressure is used for diagnostic output. In this embodiment, the division gage junction points B1 and C1 are used to output the differential output Vout for diagnostic. Thus, diagnostic and the measurement can be provided with only one bridge circuit at the same time.

Moreover, as shown in FIG. 1, four division gage resistors Ra1, Ra2, Rd1, and Rd2 included in the center portion gage resistors are equidistantly arranged from the center of the diaphragm 14, so that they are arranged at places where the stresses are even. This suppresses variation in sensitivity due to placement deviation of the division gage resistors.

Moreover, it is known that when the temperature varies, at locations where stress distributions are different from each other, the stress distributions vary with temperature variation differently. On the other hand, according to this embodiment, each group of the division gage resistors are arranged at places where stress distributions are even, so that sensitivity-temperature characteristic can be improved.

In Japanese patent No. 3049532, a ring groove was formed at the diaphragm to provide a thick portion and thin portion. In this embodiment, such a diaphragm can be adopted. However, the shape of the diaphragm becomes a complicated, so that the diaphragm may be formed with deviation in positions of respective elements. Then, in this embodiment, the diaphragm 14 has an even thickness to eliminate such a trouble. Moreover, this structure can reduce the cost.

In this embodiment, if resistances of the leader patterns 15 or the like have dispersion, this affects the detection sensitivity. Then, the sizes and the shapes of the leader patterns 15 are equalized in this embodiment.

Figure 7:
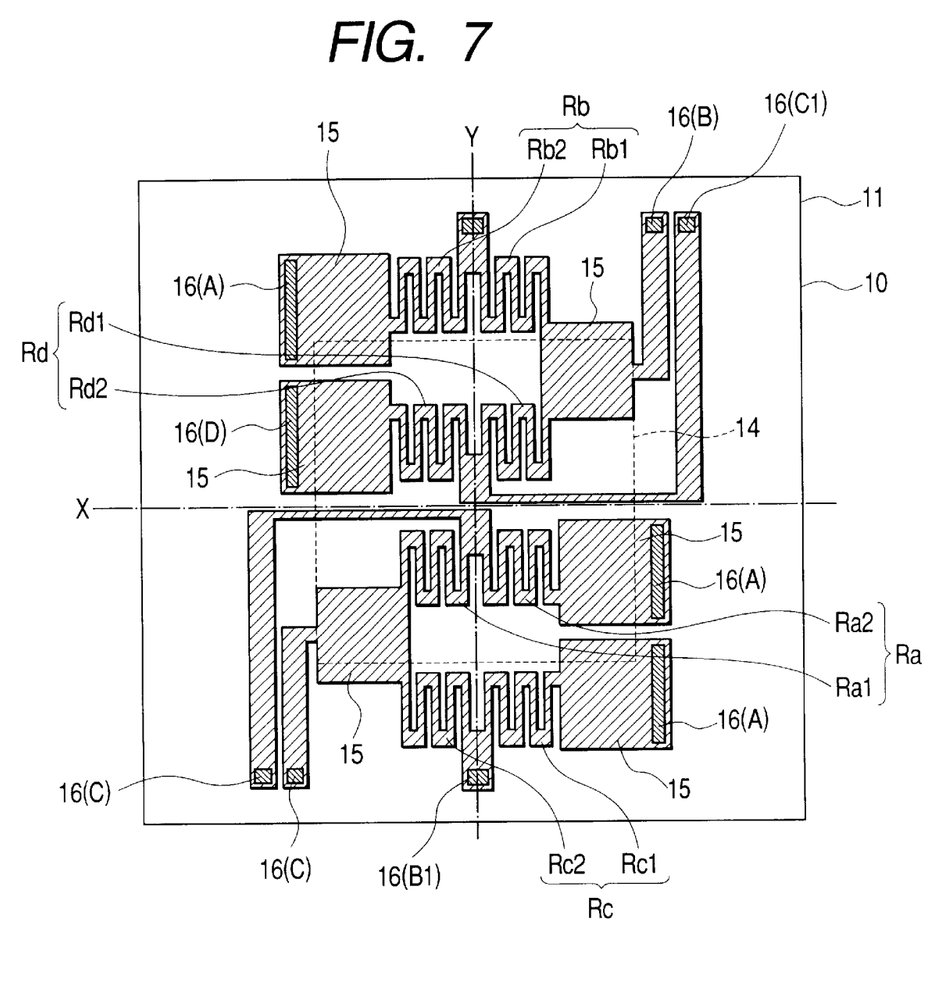
FIG. 7 is a plan view of a modified arrangement of the gage resistors according to this invention.

FIG. 7 is a plan view of a modified arrangement of the gage resistors.

The arrangement of the division gage resistors according to this embodiment shown in FIG. 1 may be modified to that shown in FIG. 7. In the arrangement in FIG. 1, division gage resistors Ra1 and Ra2 are arranged symmetrically with respect to X axis, and similarly, division gage resistors Rd1 and Rd2 are arranged symmetrically with respect to X axis. Moreover, division gage resistors Ra1 and Rd1 are arranged symmetrically with respect to Y axis, and similarly, division gage resistors Ra2 and Rd2 are arranged symmetrically with respect to Y axis. On the other hand, in the arrangement shown in FIG. 7, the division gage resistors Ra1 and Ra2 are arranged symmetrically with respect to Y axis, and similarly, the division gage resistors Rd1 and Rd2 are arranged symmetrically with respect to Y axis. Moreover, the division gage resistors Ra1 and Rd2 are arranged symmetrically with respect to X axis, and similarly, the division gage resistors Ra2 and Rd1 are arranged symmetrically with respect to X axis.

Figure 8:
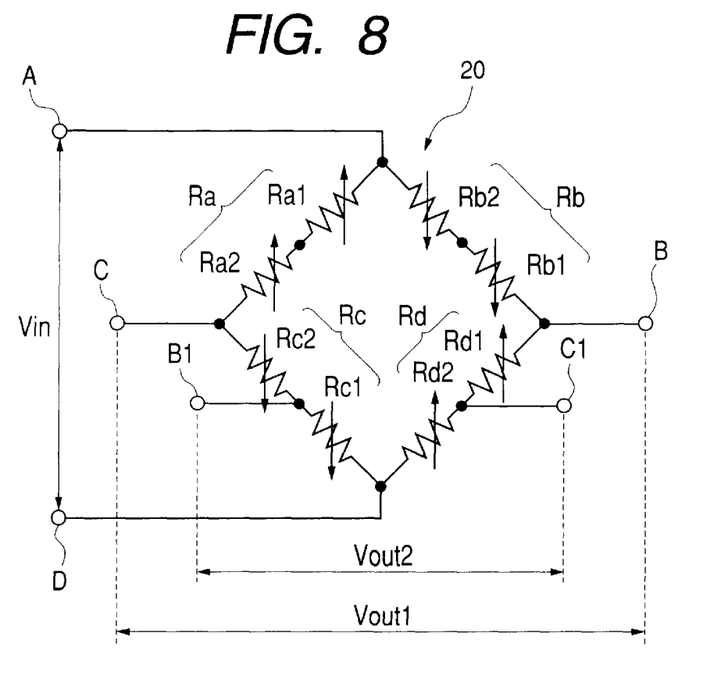
FIG. 8 is an equivalent circuit diagram of the bridge circuit shown in FIG. 7.

FIG. 8 is an equivalent circuit diagram of the semiconductor dynamic quantity sensor shown in FIG. 7. In FIG. 7, though the arrangement of the gage resistors in the circuit diagram are different from that shown in FIG. 3, respective terminals A, B, C, D, B1, and C1 are provided for the same operations.

In this embodiment, the potential difference between two division gage resistor junction points are used for diagnostic. The pair of two division gage resistor junction points can be freely determined as long as the potentials thereat agree with each other when no pressure. For example, in FIG. 3, the potential difference between the division gage resistor junction points between the division gage resistors Ra1 and Ra2 and between the division gage resistors Rc1 and Rc2 can be used as diagnostic output.

Moreover, to increase the accuracy of diagnostic operation, a plurality of potential differences (a plurality of pairs of division gage resistor junction points) may be used at the same time.

More specifically, the potential difference between division gage resistor junction points between the division gage resistors Ra1 and Ra2 and between the division gage resistors Rc1 and Rc2 is further used in addition to the potential difference Vout2 between terminals B1 and C1 to provide two diagnostic outputs or to outputs one result obtained through logic operation of two diagnostic results.

Figure 9:
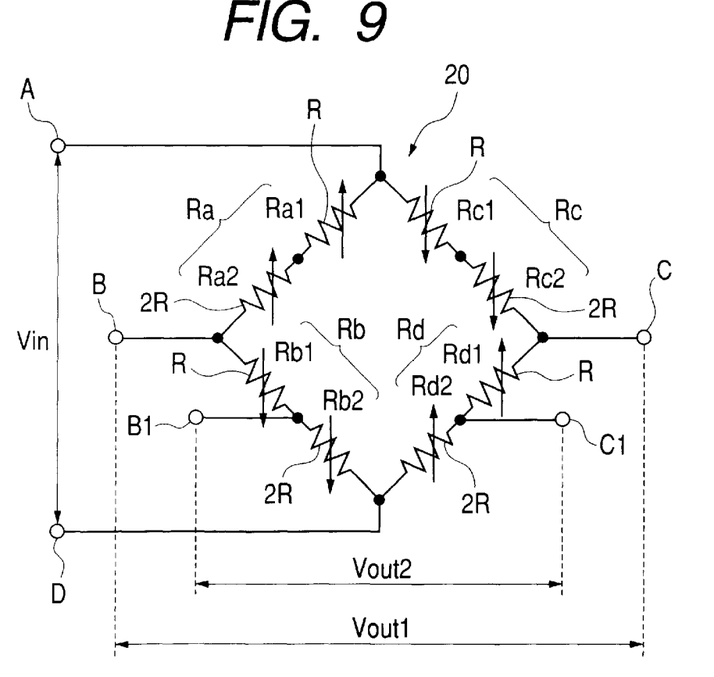
FIG. 9 is an equivalent circuit diagram of a modified example obtained from the structure shown in FIG. 3, wherein the ratio in resistance between the division gage resistors at the same side of the bridge circuit is 1:2.

Furthermore, eight division gage resistors Ra1 to Rd2 may have different resistances. FIG. 9 shows this modified example. In FIG. 9, the ratios in resistance between the division gage resistors Rd1 and Rd2 and between Rb1 and Rb2 are 1:2. Thus, in the normal condition, the potential difference Vout 1 is three halves of the potential difference Vout2 for diagnostic operation.

If this relation is not maintained, a failure in the sensor S1 can be judged. That is, the division gage resistor junction points for diagnostic output are determined to provide the same dividing ratio. More specifically, in FIG. 9, the division gage resistor junction points are determined to have the ratio in resistance Rb1:Rb2=Rd1:Rd2.

Moreover, in the above-mentioned embodiment, four gage resistors Ra to Rd are divided into two, respectively. However, the number of division resistors from one gage resistor may be that other than two, for example, three or more. In the case of three division gage resistors, a couple of division gage resistor junction points are determined to output the same potential thereat when no dynamic quantity is applied. The potential difference between the couple of division gage resistors junction points is used for diagnostic.

In the bridge circuit 20, offset voltages may exist at the potential difference Vout of the sensor output and the potential difference Vout2 for diagnostic. These offset voltages are defined as voltages at these outputs when no pressure is applied and may result in errors.

These offset voltages in the bridge circuit are caused by wiring resistance. That is, the presence of the wiring resistance causes the offset voltages in the bridge circuit 20 in accordance with the form of the wiring pattern.

Figure 10:
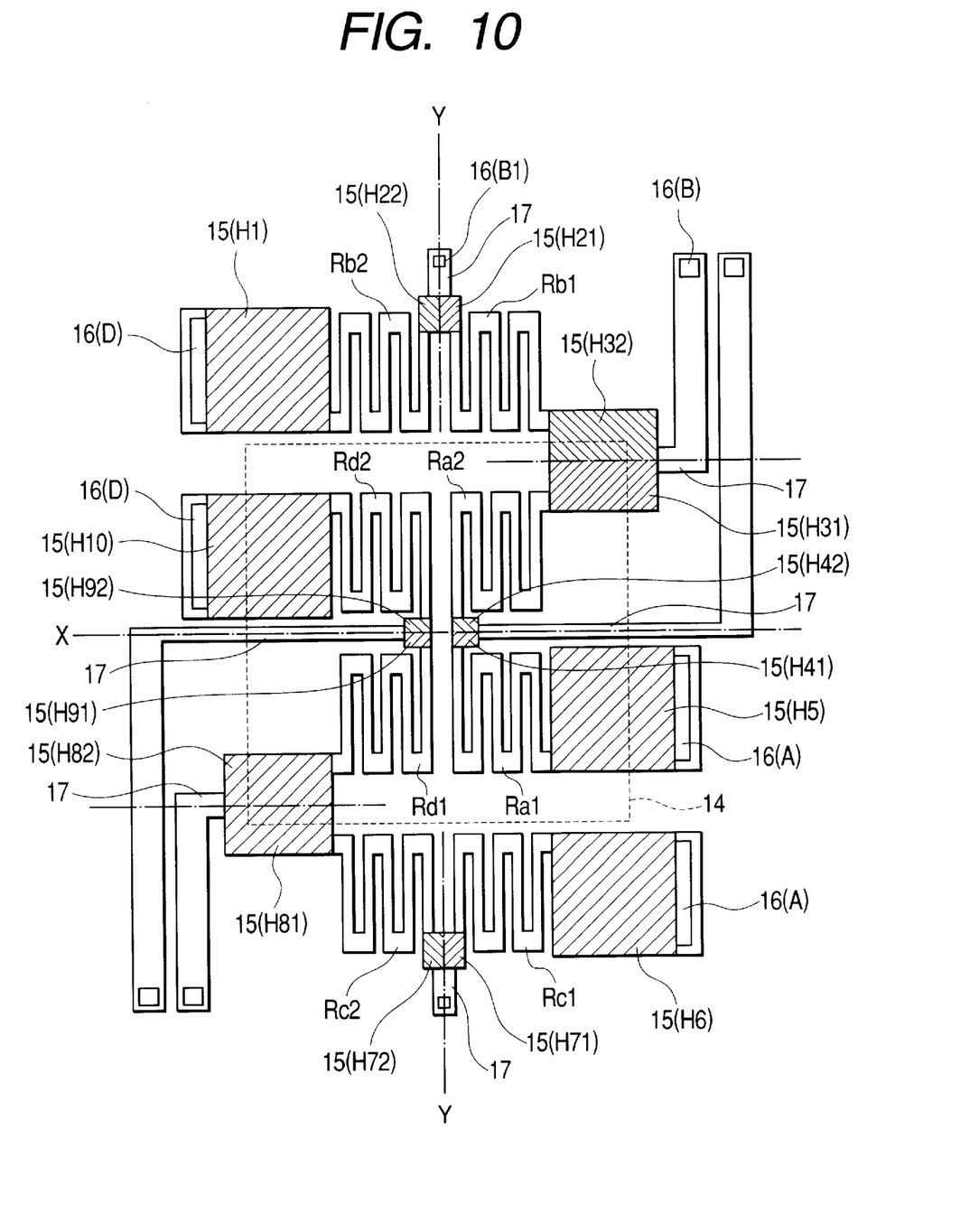
FIG. 10 is an enlarged plan view of a circuit pattern shown in FIG. 1.
Figure 11:
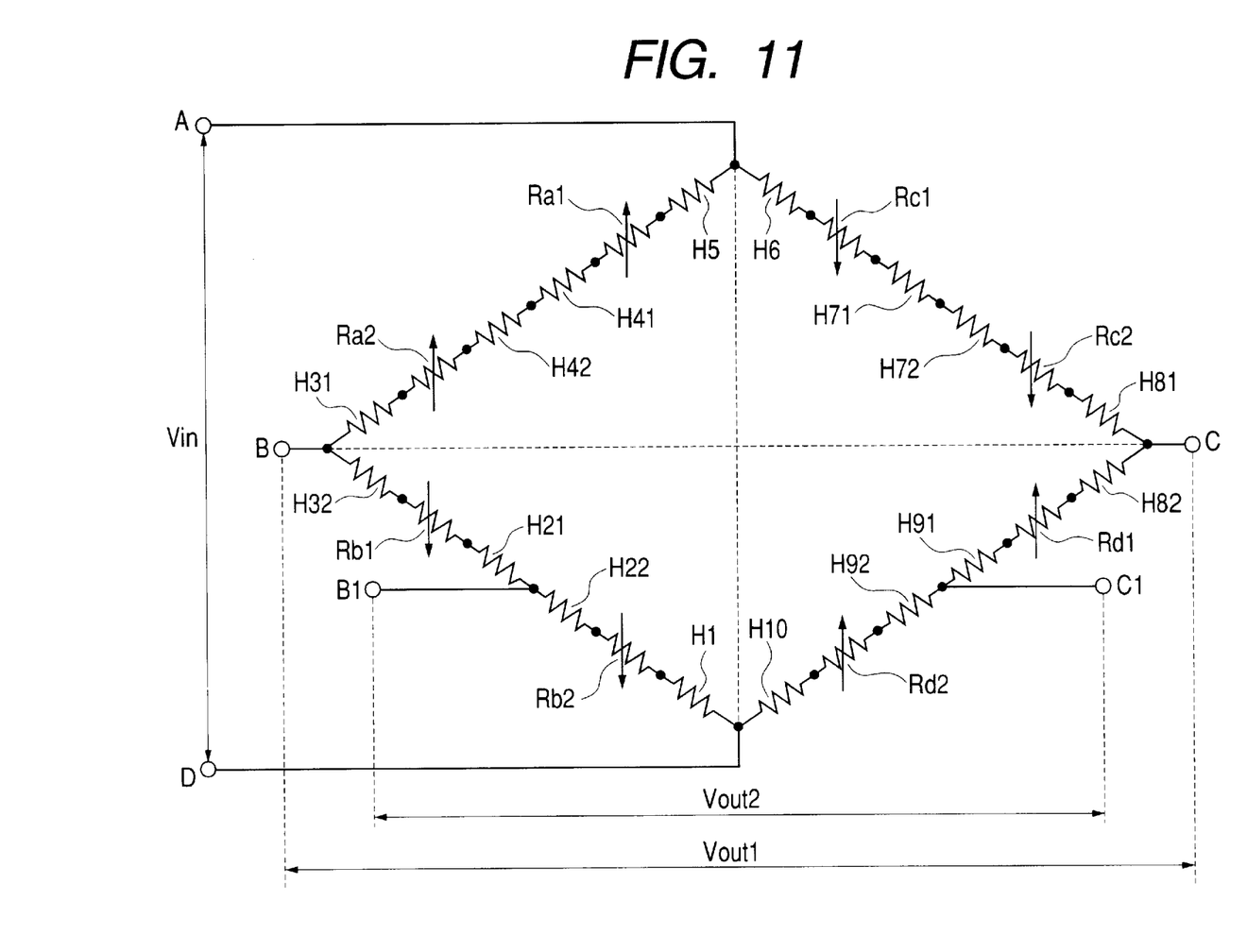
FIG. 11 is an equivalent circuit diagram of the bridge circuit to more precisely show the wiring resistance in the bridge circuit in FIG. 3.

FIG. 10 is a plan view of a circuit pattern, wherein the wiring patterns of the leader portions 15 are modified from those shown in FIG. 1 to prevent offset voltage generation. FIG. 11 is an equivalent circuit diagram of the bridge circuit 20 shown in FIG. 10 to more precisely show the wiring resistance in the bridge circuit 20 than that shown in FIG. 3.

In FIG. 10, the leader portions 15 are hatched to be clearly shown. Wiring resistances of the leader portions 15 correspond to the wiring patterns (wiring resistances) H1 to H10 in FIG. 11. Thus, the references for leader portions 15 in FIG. 10 are shown with parentheses including either of the wiring resistances.

More specifically, wiring patterns (wiring resistances) H21, H22, H41, H42, H71, H72, H91, and H92 correspond to wiring patterns between division gage resistors Ra1 to Rd2, i.e., wiring patterns between division gage resistors.

Moreover, wiring patterns (wiring resistances) H31, H32, H81, and H82 correspond to wiring patterns for connecting the terminals B and C to the division gage resistors, respectively. Furthermore, wiring patterns H5 and H6 correspond to the wiring patterns connecting the first potential A to gage resistors, respectively. Moreover, wiring resistances H1 and H10 correspond to wiring patterns connecting the second potential D to the division gage resistors, respectively.

Here, the boundary between the wiring pattern H21 ad H22 agrees with the center line (dashed line in FIG. 10) of a thin pattern 17 for connection between the leader portion 15 and a contact portion 16. Similarly, boundaries of pairs of wiring patterns H31 and H32, H41 and H42, H71 and H72, H81 and H82, H91 and H92 correspond center lines of thin pattern connected to the contact portions 16, respectively.

As mentioned above, in the bridge circuit 20, if it is viewed from terminals B and C toward the terminal A, there are successively arranged, wiring patterns H31 and H81 connecting the terminals B and C to division gage resistors, respectively, wiring patterns H41, H42, H71, and H72 connecting between division gage resistors and wiring patterns H5 and H6 connecting division resistors to the terminal A.

On the other hand, if it is viewed from terminals B and C toward the terminal D, there are successively arranged, wiring patterns H32 and H82 connecting the terminals B and C to division gage resistors, wiring patterns H21, H22, H91, and H92 connecting between division gage resistors, and wiring patterns H1 and H10 connecting division resistors to the second potential D.

Here, in this embodiment, to reduce the offset voltages, wiring resistances of wiring patterns at corresponding positions with respect to a line connecting the terminal B to terminal C in the equivalent circuit diagram are equalized.

In other words, out of the wiring patterns H5 and H6 between the first potential A and division gage resistors, the wiring patterns H1 and H10 between the second potential D and division gage resistors, the wiring patterns H31 and H32, H81, and H82, and wiring patterns H21, H22, H41, H42, H71, H72, H91, and H92 between the division gage resistors, a pair of wiring patterns arranged at line-symmetrical positions with respect to line connecting the terminal B to C have the same resistance.

More specifically, in FIG. 11, the wiring patterns H1 and H5 have the same wiring resistance. Similarly, pairs of the wiring patterns H22 and H41, the wiring patterns H21 and H42, the wiring patterns H32 and H31, the wiring patterns H10 and H6, the wiring patterns H92 and H71, the wiring patterns H91 and H71, and the wiring patterns H82 and H81, have the same wiring resistances, respectively. This structure is referred to as "line-symmetrical wiring resistance structure regarding B to C line".

According to this structure, in the condition that potentials are applied to terminals A and B, and the diaphragm 14 is not bent, the voltage difference between the first potential A and the terminal B is equalized to the voltage difference between the terminal B and the second potential terminal D. On the other hand, the voltage difference between the terminals A and C is equalized to the voltage difference between the terminals C and D.

If it is assumed that the relation of the wiring resistances in the bridge circuit does not satisfy the condition in "line-symmetrical wiring resistance structure regarding B to C line", the voltage difference between the terminals A and B differs that between the terminals B and D though no pressure is applied to the diaphragm 14. Thus, a voltage difference appears between the terminals B and C as an error in the sensor output Vout1.

On the other hand, according to this embodiment, when no pressure is applied to the diaphragm 14, the offset voltage between terminals B and C becomes zero, that is, the occurrence of offset voltage between terminals B and C can be suppressed. Thus, the sensor output Vout1 includes no offset voltage.

Accordingly, the use of "line-symmetrical wiring resistance structure regarding B to C line" provides an accurate output characteristic, so that this suppresses variation in detection sensitivity due to displacement of gage resistors.

Moreover, in addition to "line-symmetrical wiring resistance structure regarding B to C line", out of wiring patterns H1, H21, H22, H31, H32, H41, H42, H5, H6, H71, H72, H81, H82, H91, H92, H10, favorably, each pair of wiring patterns at line-symmetrical positions with respect to the line between the first potential A and the second potential D have the same wiring resistance.

More specifically, in FIG. 11, the wiring pattern H1 has the same resistance as the wiring pattern H10; the wiring pattern H22, the wiring pattern H92; the wiring pattern H21, the wiring pattern H91; the wiring pattern H32, the wiring pattern H82; the wiring pattern H31, the wiring pattern H81; the wiring pattern H42, the wiring pattern H72; the wiring pattern H41, the wiring pattern H71; and the wiring pattern H5, the wiring pattern H6. This structure is referred to as "line-symmetrical wiring resistance structure regarding A to D line".

According to this structure, in the condition that the diaphragm 14 does not bend, and that the voltage is applied between the first potential point A and the second potential point D, the voltage difference between the division gage resistor junction point B1 and the second potential point D is equalized to the voltage difference between the second potential point D and the division gage resistor junction point C1.

That is, the potential difference Vout2 between the division gage resistor junction points B1 and C1 is dependent on wiring resistances between the division gage resistor junction points B1 and C1. For example, in FIG. 11, if it is assumed that the wiring resistance of the wiring pattern H1 is different from that of the wiring pattern H10, an offset voltage is developed because the potential difference between the division gage resistor junction point B1 and the second potential point D is different from that between the second potential D and the division gage resistor junction point C1.

On the other hand, the use of "line-symmetrical wiring resistance structure regarding A to D line" makes the offset voltage zero between the division gage resistor junction points B1 and C1 when no pressure is applied. Thus, this suppresses the offset voltage at the diagnostic output Vout2, so that a more accurate diagnostic operation can be provided.

Here, both of "line-symmetrical wiring resistance structure regarding B to C line" and "line-symmetrical wiring resistance structure regarding A to D line" can be easily provided by making all wiring patterns H1, H21, H22, H31, H32 H41, H42, H5, H6, H71, H72, H81, H82, H91, H92, H10 have the same wiring resistance. This provides a bridge circuit with a simple structure.

In this embodiment, the wiring patterns H1 to H10 (leader portions 15) for connection between the division gage resistors Ra1 to Rd2 have rectangular shapes. The size of each rectangular portion determines the wiring resistance.

Figure 12:
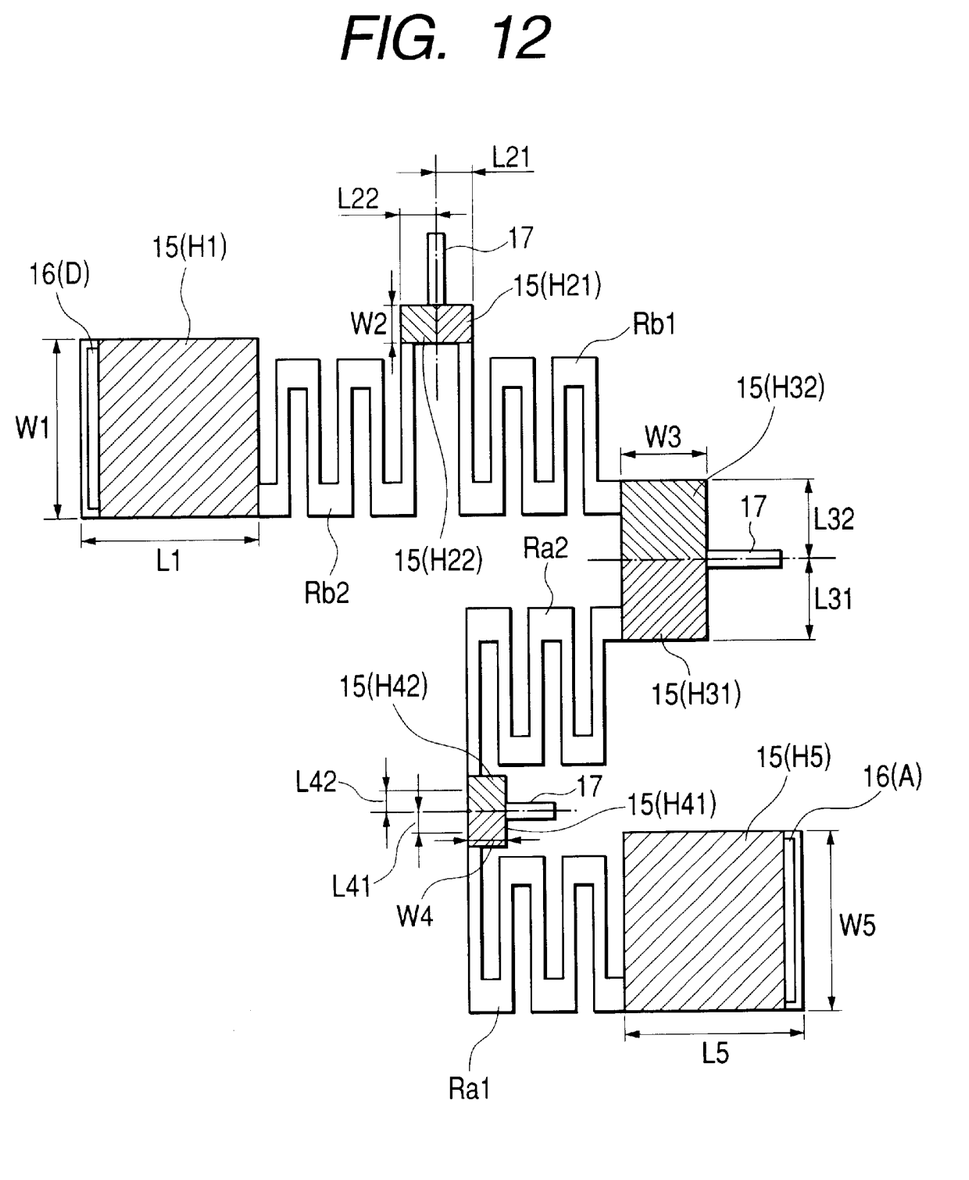
FIG. 12 is a plan view illustrating the half portion of the bride circuit shown in FIG. 10.

FIG. 12 shows the half portion of the bride circuit 20 including the first potential point A, the division gage resistor junction point B, and the second potential point D (division gage resistors Ra1, Ra2, Rb1, and Rb2).

The gage resistors Ra to Rd and leader portions 15 (wiring patterns H1 to H10) are formed by ion-implantation or thermal diffusion of boron or the like in the silicon substrate 10. Here, if it is assumed that a sheet resistance is ρs, a wiring length is L (in Y direction), a width is W (lateral direction), the wiring resistance $R = \rho s \cdot L/W$.

The sheet resistance ρs is dependent on the condition of the ion-implantation and the thermal diffusion temperature. Thus, if these wiring patterns and resistors are formed under the same ion-implantation condition or at the same thermal diffusion temperature, the resistance R is dependent on L/W, for example, L1/W1.

Thus, equalizing the ratios of neighboring sides of the rectangular shapes between two wiring patterns provide the same wiring resistance. The ratios L/W can be adjusted during making a mask pattern for ion-implantation.

More specifically, the ratio of L1/W1 (wiring pattern H1) is equal to that of L5/W5 (wiring pattern H5); the ratio of L22/W2 (wiring pattern H22) is equal to that of L41/W4 (wiring pattern H41); the ratio of L21/W2 (wiring pattern H21) is equal to that of L42/W4 (wiring pattern H42); and the ratio of L32/W3 (wiring pattern H32) equal to that of L31/W3 (wiring pattern H31).

The other half portion of the bridge circuit 20, that is, the portion including the division gage resistors Rc1, Rc2, Rd1, and Rd2 is formed similarly. This provides "line-symmetrical wiring resistance structure regarding B to C line".

Moreover, each pair of wiring patterns at line-symmetrical positions regarding line A–D are made to have the same ratio L/W. This provides "line-symmetrical wiring resistance structure regarding A to D line".

Moreover, making ratios of all wiring patterns H1 to H10 equal to each other provides the same wiring resistance therebetween.

Furthermore, there may be dispersion in the manufacturing process. Thus, to reduce the dispersion in wiring resistances of the wiring patterns H1 to H10, the diffusion concentration (concentration of impurity) in the wiring pattern is increased, for example, at about $1 \times 10^{20}$ cm$^{-3}$ to reduce the resistance (reduces the sheet resistance ρs).

In addition, making the diffusion concentration at respective wiring patterns H1 to H10 higher than that at gage resistors Ra to Rd further reduces the offset voltage. More specifically, making the diffusion concentration at the wiring patterns H1 to H10 equal to that at the contact portion 16 improves the offset voltage without any additional process.

As mentioned above, in the structures shown in FIGS. 1 and 10, the offset voltage is suppressed by adjusting the wiring resistance of the wiring patterns H1 to H10 by trimming the mask pattern for ion-implantation, that is, trimming the shape of the rectangular shapes of the wiring patterns H1 to H10. However, the above-mentioned trimming provides a low resistance variation, so that there is limitation in reducing the offset voltage. In other words, if the wiring patterns are made larger for trimming, the size of the sensor is also made large.

Figure 13:
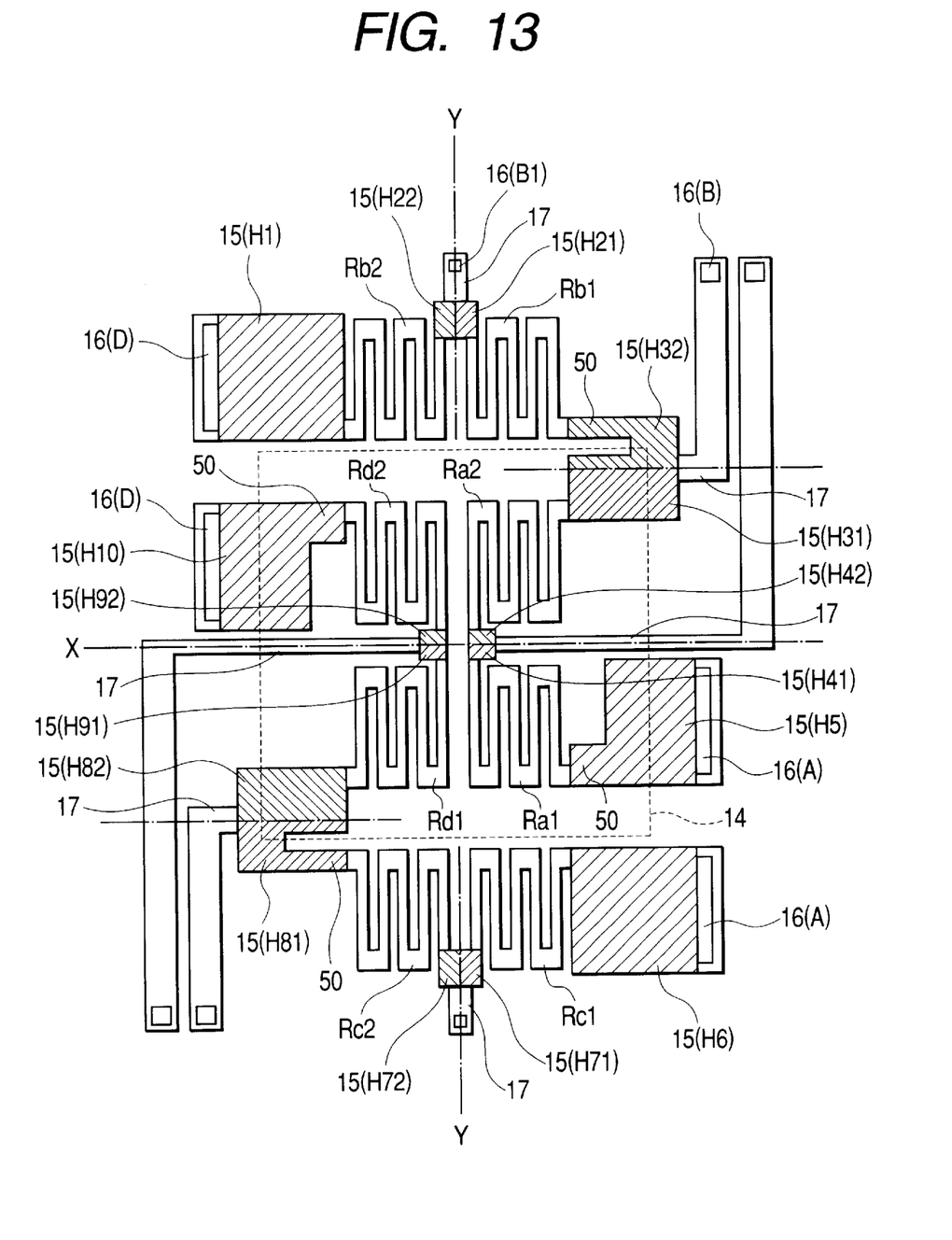
FIG. 13 is a plan view illustrating a modification for further reducing the offset voltage.

FIG. 13 shows a modification for further reducing the offset voltage. The structure shown in FIG. 13 is obtained by partially modifying the structure shown in FIG. 10. That is, resistance adjusting portions 50 are further provided by forming notches to adjust the wiring resistances of the wiring patterns H1 to H10.

In FIG. 13, notches are formed at wiring patterns H32, H5, H81, and H10 to provide the resistance adjusting portions 50 as a recess portion. Here, the division gage resistors Ra1 to Rd1 and Ra2 to Rd2 have folding portions, respectively, that is, a plurality of straight bars extending in Y direction and arranged in X direction, and short bars connecting ends of successive straight bars in series to form the folding portions. On the other hand, the notch having a rectangular shape is arranged in the Y direction, that is, the notch is formed in the direction perpendicular to the direction in which the straight bas extends.

Accordingly, in FIG. 13, the wiring patterns H32, H5, H81, and H10 have resistance adjusting portions 50 having recess portions defined by the notches. This largely varies the resistances of these wiring patterns than the resistance adjusting method used in the structure shown in FIG. 10.

As mentioned above, the resistance adjusting portion 50 can vary the wiring resistance without extending the wiring pattern shape, so that the adjustment of wiring resistance can be provided without change of the area occupied by the sensor.

In other words, each of the division gage resistors has straight bars extending in Y direction and turning portions connecting therebetween. The notch has a rectangular shape, and the longitudinal direction of the rectangular shape of the notch is arranged in a X direction perpendicular to Y direction. In the division gage resistors Ra1 to Rd1 and Ra2 to Rd2, resistance varies only at the straight bars of the division gage resistor which extends in X direction. On the other hand, the (recess) resistance adjusting portion 50 is formed by providing the notch having a rectangular shape of which longitudinal direction is perpendicular to the longitudinal direction of the straight bars of the division resistor. This prevents variation in the resistance of the recess resistance adjusting portion 50.

In other words, if a notch is provided in the longitudinal direction of the straight bars of a division gage resistor, the recess resistance adjusting potion 50 forms a division gage resistor itself, wherein its resistance varies with application of a pressure.

These resistance adjusting portions 50 are easily formed by adjusting the mask pattern for forming the wiring patterns H1 to H10 by ion-implantation.

(Modifications)

This invention is applicable to a semiconductor pressure sensor comprising a metal sleeve having a closed end having a thin portion on which a semiconductor substrate is arranged, the other end of the metal sleeve being open to introduces a pressure to the thin portion. The pressure bends the thin portion. Then the semiconductor itself also bends as a diaphragm. Thus, stress in the semiconductor substrate is detected by gage resistors in the semiconductor substrate.

Moreover, this invention is applicable to an acceleration sensor having a diaphragm which is bent by shock generated by application of acceleration, wherein the stresses in the diaphragm are detected with gage resistors.

Figure 14:
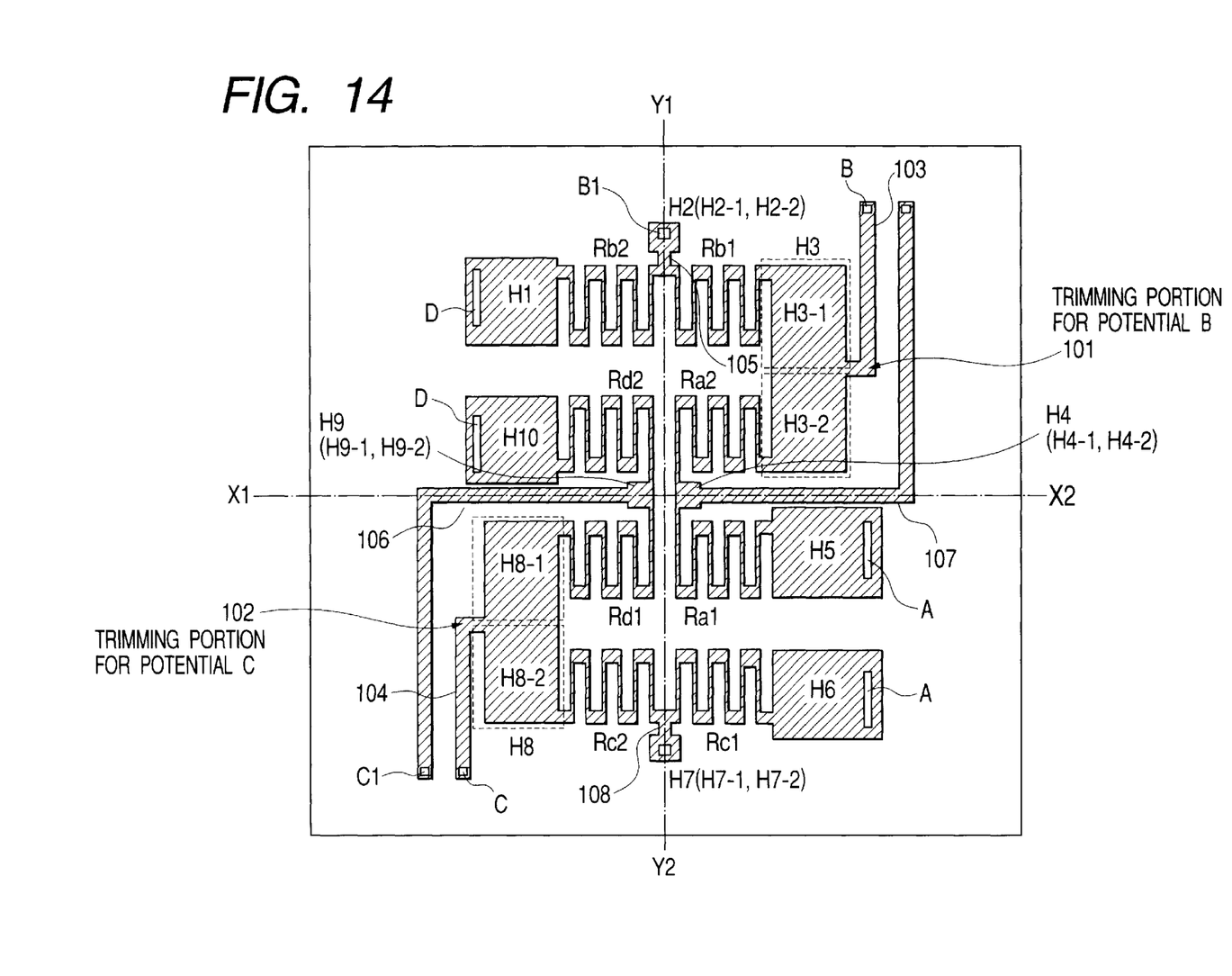
FIG. 14 is a plan view of a semiconductor dynamic quantity sensor of which offset voltage is reduced according to this invention.

FIG. 14 is a plan view of a semiconductor dynamic quantity sensor according to a modification of this embodiment.

The potential at the division gage resistor junction points B and C are trimmed by adjusting the position of a leader wiring 103 connected to the wiring patterns.

In FIG. 14, the wiring patterns H3-1 and H3-2 (H3) connected to the division gage resistors Rb1 and Ra2 are combined to have a rectangular shape of which longitudinal direction agrees with Y axis. A leader wiring pattern 103 is connected to a center line of the rectangular shape extending X axis. Adjusting the position of the junction point between the leader wiring pattern 103 and the wiring pattern H3 (trimming portion) controls the wiring resistance of the wiring patterns of H3-1 and H3-2.

This adjusts the potential of terminal B. Similarly, the potential C is adjusted by adjusting the position of the junction point between the leader wiring pattern 104 and the wiring pattern H8. This structure provides fine adjustment of the potentials B and C though the ratio L/W between the sides of the rectangular shape of the wiring patterns cannot be equalized partially. Thus, the offset voltage can be easily reduced if there is a limitation in forming the wiring patterns.

Moreover, the wiring patterns H2-1 and H2-2 (H2) connected to the division gage resistors Rb1 and Rb2 are combined to have a rectangular shape. A leader wiring pattern 105 is connected to a center line of the rectangular shape of the wiring patterns H2-1 and H2-2. Adjusting the position of the junction point between the leader wiring pattern 105 and the wiring pattern H3 (trimming portion) controls the wiring resistance of the wiring patterns of H2-1 and H2-2. Similarly, the wiring patterns H7-1 and H7-2 (H7) connected to the division gage resistors Rc1 and Rc2 are combined to have a rectangular shape. A leader wiring pattern 108 is connected to a center line of the rectangular shape of the wiring patterns H7-1 and H7-2. Adjusting the position of the junction point between the leader wiring pattern 108 and the wiring pattern H7 (trimming portion) controls the wiring resistance of the wiring patterns of H7-1 and H7-2.

Furthermore, the wiring patterns H9-1 and H9-2 (H9) connected to the division gage resistors Rd1 and Rd2 are combined to have a rectangular shape. A leader wiring pattern 106 is connected to a center line of the rectangular shape of the wiring patterns H9-1 and H9-2. Adjusting the position of the junction point between the leader wiring pattern 106 and the wiring pattern H9 (trimming portion) controls the wiring resistance of the wiring patterns of H9-1 and H9-2. Similarly, the wiring patterns H4-1 and H4-2 (H4) connected to the division gage resistors Ra1 and Ra2 are combined to have a rectangular shape. A leader wiring pattern 107 is connected to a center line of the rectangular shape of the wiring patterns H4-1 and H4-2. Adjusting the position of the junction point between the leader wiring pattern 107 and the wiring pattern H4 (trimming portion) controls the wiring resistance of the wiring patterns of H4-1 and H4-2.

What is claimed is:

1. A semiconductor dynamic quantity sensor comprising:
a semiconductor substrate having a diaphragm elastically deformed in accordance with application of a dynamic quantity with a stress distribution over at least said diaphragm; and
a bridge circuit including four gage resistors in said diaphragm, resistances of said gage resistors varying on the basis of stresses due to said stress distribution, respectively, said bridge circuit having first and second potential terminal inputs and having two outputs at intermediate junction points between said first and second terminal inputs, each of said four gage resistors including a plurality of division gage resistors which are separated into first and second groups, wherein said first group of division gage resistors are arranged at a first place near the center of said diaphragm such that said division gage resistors of said first group receive stresses due to said stress distribution, magnitudes of which stresses are even each other, and said second group of division gage resistors are arranged near a peripheral edge of said diaphragm such that said division gage resistors of said second group receive said stresses due to said stress distribution, magnitudes of which stresses are even with each other.

2. A semiconductor dynamic quantity sensor as claimed in claim 1, wherein a first junction point of a first pair of said division gage resistors in one of said gage resistor outputting a first potential and a second junction point of a second pair of said division gage resistors in another of said gage resistor outputting a second potential provide a diagnostic output, said first potential is substantially equal to said second potential when said dynamic quantity is not applied to said diaphragm.

3. A semiconductor dynamic quantity sensor as claimed in claim 1, wherein said semiconductor substrate comprises a support portion, and said diaphragm and said support portion are formed such that said stress due to said stress distribution at a center of said diaphragm is greatest and decreases substantially coaxially from said center to said peripheral edge of said diaphragm.

4. A semiconductor dynamic quantity sensor as claimed in claim 3, wherein said diaphragm has a shape of a square.

5. A semiconductor dynamic quantity sensor as claimed in claim 3, wherein said diaphragm has a shape of a circle.

6. A semiconductor dynamic quantity sensor as claimed in claim 2, wherein if it is assumed that first and second axes perpendicularly intersect each other at said center of said diaphragm on a top surface of said diaphragm, said division gage resistors of said first group are arranged point-symmetrically at different four quadrants defined by said first and second axes, respectively, and said division gage resistors of said second group are arranged point-symmetrically at different ones of said four quadrants.

7. A semiconductor dynamic quantity sensor as claimed in claim 1, wherein all said division gage resistors have the same resistance.

8. A semiconductor dynamic quantity sensor as claimed in claim 1, wherein said bridge circuit further comprises two wiring patterns for connection between each successive two of said division gage resistors, wherein if it is assumed that said bridge circuit including said division gage resistors and said wiring patterns are symmetrically represented in an equivalent circuit diagram, each pair of said wiring patterns arranged at line-symmetrical positions regarding a line between said intermediate junction points on said equivalent circuit diagram have the same wiring resistance.

9. A semiconductor dynamic quantity sensor as claimed in claim 8, wherein each pair of said division gage resistors arranged at line-symmetrical positions regarding a line between said first and second input points on said equivalent circuit diagram of said bridge circuit have the same wiring resistance.

10. A semiconductor dynamic quantity sensor as claimed in claim 8, wherein each pair of said wiring patterns have rectangular shapes with the same ratio between different sides of said rectangular patterns.

11. A semiconductor dynamic quantity sensor as claimed in claim 8, wherein said wiring patterns have the same wiring resistance.

12. A semiconductor dynamic quantity sensor as claimed in claim 8, wherein said wiring patterns have rectangular shapes having the same ratio between different sides of said rectangular shapes.

13. A semiconductor dynamic quantity sensor as claimed in claim 8, wherein at least one of said wiring patterns includes resistance trimming means with a notch formed in said wiring pattern for trimming said wiring resistance of said wiring pattern.

14. A semiconductor dynamic quantity sensor as claimed in claim 13, wherein each of said division gage resistors has straight bars extending in a first direction and turning portions connecting said straight bars in series, said notch has a rectangular shape, a longitudinal direction of said rectangular shape of said notch is arranged in a second direction perpendicular to said first direction.

* * * * *